(12) United States Patent
Schmitz et al.

(10) Patent No.: US 7,906,602 B2
(45) Date of Patent: *Mar. 15, 2011

(54) TREAD CAP COMPOSITION

(75) Inventors: Frank Schmitz, Bissen (LU); Filomeno Gennaro Corvasce, Mertzig (LU); Claude Charles Jacoby, Wasserbillig (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 1042 days.

This patent is subject to a terminal disclaimer.

(21) Appl. No.: 11/193,514

(22) Filed: Jul. 29, 2005

(65) Prior Publication Data

US 2006/0148945 A1 Jul. 6, 2006

Related U.S. Application Data

(60) Provisional application No. 60/640,788, filed on Dec. 30, 2004, provisional application No. 60/640,789, filed on Dec. 30, 2004.

(51) Int. Cl.
*C08F 36/00* (2006.01)
*C08F 4/28* (2006.01)
*C08F 10/14* (2006.01)
*C08F 290/06* (2006.01)

(52) U.S. Cl. ............... 526/335; 526/227; 526/348.2; 524/81

(58) Field of Classification Search .......... 526/335, 526/227, 348.2; 524/81
See application file for complete search history.

(56) References Cited

U.S. PATENT DOCUMENTS

| | | | |
|---|---|---|---|
| 3,842,883 A | 10/1974 | Masson et al. | |
| 4,675,349 A | 6/1987 | Palombo et al. | |
| 4,957,676 A | 9/1990 | Greenwood | |
| 5,585,064 A | 12/1996 | Moris-Herbeuval et al. | |
| 6,036,800 A | 3/2000 | Corvasce et al. | |
| 6,103,808 A | 8/2000 | Hashimoto | |
| 6,469,101 B2 | 10/2002 | Nahmias et al. | |
| 6,561,779 B2 | 5/2003 | Nitsch et al. | |
| 6,649,678 B1 | 11/2003 | Sandstrom | |
| 6,808,376 B2 | 10/2004 | Serener-Thielmann | |
| 6,822,043 B2 | 11/2004 | Sohnen et al. | |
| 7,015,272 B2 * | 3/2006 | Sandstrom | 524/495 |
| 7,045,578 B2 | 5/2006 | Karoto et al. | |
| 2002/0045697 A1 | 4/2002 | Sohnen et al. | |
| 2002/0198296 A1 | 12/2002 | Rawlinson et al. | |
| 2003/0199626 A1 | 10/2003 | Lin et al. | |
| 2004/0082702 A1 * | 4/2004 | Sandstrom | 524/492 |
| 2004/0181004 A1 | 9/2004 | Sandstrom et al. | |
| 2005/0009978 A1 | 1/2005 | Weydert et al. | |
| 2005/0131112 A1 * | 6/2005 | Henning et al. | 524/47 |
| 2005/0159513 A1 | 7/2005 | Henning et al. | |
| 2006/0060285 A1 | 3/2006 | Weydert et al. | |
| 2006/0144489 A1 * | 7/2006 | Schmitz et al. | 152/209.5 |

FOREIGN PATENT DOCUMENTS

| | | |
|---|---|---|
| EP | 263216 A1 | 4/1988 |
| EP | 1270657 A1 | 1/2003 |
| EP | 1 544 238 A1 * | 6/2005 |
| EP | 1544238 A1 | 6/2005 |
| JP | 4132751 | 5/1992 |

OTHER PUBLICATIONS

European Patent Office, Extended European Search Report for related European Application No. 05112689.4-2109, mailed Jun. 5, 2006.
U.S. Patent and Trademark Office, Non-Final Official Action in related U.S. Appl. No. 11/295,905 dated Feb. 2, 2009, 56 pp.
U.S. Patent and Trademark Office, Final Official Action in related U.S. Appl. No. 11/295,905 dated Jul. 28, 2009, 21 pp.

* cited by examiner

Primary Examiner — William K Cheung
(74) Attorney, Agent, or Firm — Wood, Herron & Evans, LLP

(57) ABSTRACT

A tread cap composition, in accordance with the principles of the invention, may be a composition resulting from a combination of components including: a conjugated diene-based elastomer; a reinforcing filler; an oil softener; a silane coupling agent; and an ultra high molecular weight polyethylene ("UHMWPE").

11 Claims, No Drawings

TREAD CAP COMPOSITION

CROSS-REFERENCE TO RELATED APPLICATION

This patent document claims the benefit of the filing date of Provisional U.S. Patent Application No. 60/640,788 entitled "Tread Cap Composition" and filed on Dec. 30, 2004. The entire disclosure of Provisional U.S. Patent Application No. 60/640,788 is incorporated into this patent document by reference. This application is also related to commonly assigned, copending application, Ser. No. 11/295,905, filed Dec. 7, 2005, and entitled "Method of Increasing Plasticity of Tread Composition," which claims the benefit of the filing date of Provisional U.S. Patent Application No. 60/640,789 entitled "Method of Increasing Plasticity of Tread Composition" and filed on Dec. 30, 2004, each of which is incorporated by reference herein in its entirety.

BACKGROUND OF THE INVENTION

1. Field of the Invention

This invention is directed to tread-cap compositions and products, and more particularly, to tread-cap compositions and products that include one or more macro-fillers.

2. Description of Related Art

In developing a tread cap that provides an enhanced performance characteristic, a tread cap formulation has been proposed that includes an ultra high molecular weight polyethylene macro filler and a carbon black reinforcing filler.

While such a formulation may provide an enhanced performance characteristic, it does so at the expense of other desirable properties. For example, the composition may have an undesirable compound stiffness. In addition, other performance characteristics may be less than desirable. Therefore, there is a need for improved tread cap formulations.

SUMMARY OF THE INVENTION

A tread cap composition, in accordance with the principles of the invention, may be a composition resulting from the combination of components including: a conjugated diene-based elastomer; a reinforcing filler; a mineral- or vegetable-oil softener; a silane coupling agent; and an ultra high molecular weight polyethylene ("UHMWPE").

One aspect of the invention is directed to a method of making a tread-cap composition. The method includes the steps of: mixing, at a temperature in a range of from about 135° C. to about 180° C., ingredients including: 100 phr of at least one conjugated diene-based elastomer; from about 30 to about 130 phr of at least one reinforcing filler; from about 2 to about 55 phr of at least one oil softener, the oil softener selected from the group consisting of a mineral oil having a PCA content of less than about 3% by weight, a vegetable oil, and combinations thereof; and from about 4 to about 20 phr of at least one silane coupling agent, thereby forming a first mixture. The method further includes the step of subsequently mixing, at a temperature of less than about 135° C., ingredients including: the first mixture; and from about 2 to about 50 phr of an ultrahigh molecular weight polyethylene ("UHMWPE"), thereby forming a tread-cap composition.

Other aspects of the invention include a tread-cap composition, a tread cap made from a tread-cap composition, and a tire that includes such a tread cap.

DESCRIPTION OF PREFERRED EMBODIMENTS OF THE INVENTION

A tread cap composition, in accordance with the principles of the invention, may be a composition resulting from the combination of components including: a conjugated diene-based elastomer; a reinforcing filler; a mineral oil softener; a silane coupling agent; and an ultra high molecular weight polyethylene ("UHMWPE"). As used herein, the term "ultra high molecular weight" means a molecular weight of about 500,000 or more.

The conjugated diene-based elastomer may be any suitable elastomer or combination of elastomers. Examples include polybutadiene rubber (including high cis and high vinyl), polyisoprene, natural rubber, isoprene-butadiene copolymer, emulsion-polymerized styrene-butadiene rubber, and solution-polymerized styrene-butadiene rubber (including low, mid, and high vinyl). Advantageously, the conjugated diene-based elastomer may be a sulfur-vulcanizable elastomer containing olefinic unsaturation.

The reinforcing filler may be any suitable reinforcing filler or combination of fillers. For example, the filler may include silica and/or carbon black. If desired, the reinforcing filler may be present in an amount of from about 30 to about 130 phr.

The oil softener may be any suitable mineral- or vegetable-oil softener or combination of such oil softeners. Examples of mineral oil softeners include a treated distillate aromatic extract ("TDAE") oil, a mild extraction solvate ("MES") oil, and a special residual aromatic extract ("S-RAE"). Advantageously, the mineral oil softener may have a polycyclic aromatic composition ("PCA") content of less than about 3% by weight. Also, if desired, the softener or combination of softeners may be present in an amount of from about 2 to about 55 phr. Examples of commercially available TDAE, MES, and S-RAE oils include Vivatec 500 oil from H&R Wasag A G (a TDAE oil), Catenex SNR oil from Shell (an MES oil), and NC140 oil from Japan Energy Corp. (an S-RAE oil).

The silane coupling agent may be any suitable agent or combination of agents. Examples include bis-3-(triethoxysilylpropyl) disulfide ("TESPD"), bis-3-(triethoxysilylpropyl) tetrasulfide ("TESPT"), and/or a blocked mercaptosilane. Advantageously, the blocked mercaptosilane is one or more of NXT or NXT-LoV from GE Silicones. If desired the silane coupling agent may be present in an amount of from about 4 to about 20 phr.

The UHMWPE may be any suitable UHMWPE. If desired, the UHMWPE may have a size in a range of from about 10 to about 200 micrometers, a molecular weight in a range of from about 500,000 to about 11,000,000, a standard bulk density of about 0.4 g/cm$^3$ or greater, and a low bulk density of about 0.25 g/cm$^3$ or less. If desired, the UHMWPE may be present in an amount of from about 2 to about 50 phr, advantageously from about 5 to about 13 phr. Also, if desired, the UHMWPE may be present in an amount of from about 5 to about 50 phr, or in an amount of from about 2 to about 3 phr. One example of a suitable UHMWPE is GUR® 4120 from the Ticona Company. GUR® 4120 has an average molecular weight of 5,000,000 g/mol, as calculated using Margolies' equation (M=5.37·104[η]$^{1.49}$ where η is in dl/g).

EXAMPLE

The following example further illustrates several aspects of the invention. However, the invention is not limited by the example.

In this example, tread cap compositions that included an amount of UHMWPE, and in some cases, an additional amount of a mineral oil softener, were compared with a tread cap composition that did not include these ingredients. In addition, tread cap compositions in which the UHMWPE was added during a first non-productive mix stage were compared with tread cap compositions in which the UHMWPE was added in a subsequent cold-remilling stage.

With reference to Table I, sample A was the control sample, and did not include any UHMWPE or additional mineral oil softener. In the first non-productive mix stage, ingredients were added to a lab Banbury mixer in the amounts shown in Table I, and mixed for about 4.5 minutes to a temperature of about 160° C. In a second non-productive mix stage, the mixture resulting from the first non-productive mix stage was mixed for about 4.5 minutes to a temperature of about 160° C.

The contents of the mixer then were cooled to a temperature of about 23° C. over a period of about 600 minutes. Then the productive-mix-stage ingredients were added to the mixture, in the amounts shown in Table I; and the ingredients were mixed for about 2 minutes to a temperature of about 110° C.

With reference to Table I, samples B and D were prepared using processing parameters identical to those of sample A. Samples C and E were prepared using those same processing parameters, as well as a third non-productive mix stage. This third mix stage was a cold remill of the second mix stage, with the ingredients being mixed for about 2 minutes to a temperature of about 110° C. In samples B and D, the UHMWPE was added during the first non-productive mix stage; whereas in samples C and E, the UHMWPE was added during the third non-productive mix stage. Also, samples D and E included an additional amount (5 phr) of the mineral oil softener.

TABLE I

| | Samples | | | | |
|---|---|---|---|---|---|
| | A | B | C | D | E |
| First Non-Productive Mix Stage | | | | | |
| BR rubber[1] | 45 | 45 | 45 | 45 | 45 |
| S-SBR (55 phr) extended with TDAE oil[2] (20.63 phr) | 75.63 | 75.63 | 75.63 | 75.63 | 75.63 |
| Antioxidants/Antiozonants[3] | 4 | 4 | 4 | 4 | 4 |
| TDAE oil[4] | 19.38 | 19.38 | 19.38 | 24.38 | 24.38 |
| Fatty acid[5] | 3 | 3 | 3 | 3 | 3 |
| TESPD silane coupling agent[6] | 13.13 | 13.13 | 13.13 | 13.13 | 13.13 |
| UHMWPE[7] | | 5 | | 5 | |
| Silica[8] | 105 | 105 | 105 | 105 | 105 |
| Second Non-Productive Mix Stage | | | | | |
| Third Non-Productive Mix Stage | Remill of second non-productive mix stage | | | | |
| UHMWPE[7] | | | 5 | | 5 |
| Productive Mix Stage | | | | | |
| Antioxidants/Antiozonants[9] | 0.5 | 0.5 | 0.5 | 0.5 | 0.5 |
| Zinc Oxide[10] | 2.5 | 2.5 | 2.5 | 2.5 | 2.5 |
| Sulfur (elemental) | 1.4 | 1.4 | 1.4 | 1.4 | 1.4 |
| Sulfenamide type accelerator[11] | 1.5 | 1.5 | 1.5 | 1.5 | 1.5 |
| Co-accelerator DPG[12] | 2.4 | 2.4 | 2.4 | 2.4 | 2.4 |

[1]Budene 1207
[2]SLR 4630
[3]6-PPD (2.5 phr), refined paraffin wax (0.5 phr), and microcrystalline wax (1 phr)
[4]Vivatec 500
[5]Stearic acid
[6]X-266S
[7]GUR 4120
[8]Degussa VN-2 type (125 m$^2$/g)
[9]DTPD (mixed aryl-p-phenylenediamines)
[10]Untreated French Process
[11]CBS TABLE I-continued

| | Samples | | | | |
|---|---|---|---|---|---|
| | A | B | C | D | E |

[12]diphenylguanidine

TABLE II

| | | A | B | C | D | E |
|---|---|---|---|---|---|---|
| Specific Gravity | 23° C. | 100 | 100 | 100 | 99 | 99 |
| Mooney Viscosity | MS (1 + 1.5, 100° C.) | 100 | 112 | 98 | 108 | 88 |
| Rheometer 160 C. | Amount | 100 | 99 | 106 | 91 | 93 |
| | T90 | 100 | 95 | 95 | 104 | 95 |
| RPA (550), 1 HZ, 100 C. | G' 1% | 100 | 102 | 103 | 90 | 90 |
| | tan d 10% | 100 | 98 | 93 | 97 | 94 |
| Hardness | Shore A 23° C. | 100 | 114 | 104 | 105 | 103 |
| Ring Modulus 23 C. | Elongation | 100 | 96 | 89 | 104 | 99 |
| | Mod 100% | 100 | 171 | 129 | 134 | 115 |
| | Mod 300% | 100 | 129 | 126 | 108 | 110 |
| | Tensile Strength | 100 | 110 | 100 | 104 | 103 |
| Zwick Rebound | Rebound 23° C. | 100 | 97 | 98 | 97 | 99 |
| Abrasion | DIN Abrasion | 100 | 113 | 92 | 115 | 99 |
| Metravib, 1.5%, 7.8 Hz | G' −30° C. | 100 | 105 | 106 | 100 | 98 |
| | tan δ −20° C. | 100 | 100 | 102 | 101 | 104 |

With reference to Table II, the experimental results show that samples B-E performed quite well in comparison with the control (sample A). For example, the G'−30° C. and tan δ−20° C. data for these samples (B-E) are comparable with the control, indicating that such tread caps would perform well in wet and/or winter conditions. At the same time, the hardness values for samples C-E, and the Mooney viscosity values for samples C and E, remained relatively low.

While the present invention has been illustrated by the description of embodiments, and while the illustrative embodiments have been described in considerable detail, it is not the intention of the inventors to restrict or in any way limit the scope of the appended claims to such detail. Additional advantages and modifications readily will appear to those skilled in the art. The invention in its broader aspects is therefore not limited to the specific details, representative apparatus and methods, and illustrative examples shown and described. Accordingly, departures may be made from such details without departing from the spirit or scope of the inventors' general inventive concept.

What is claimed is:

1. A method of making a tire tread-cap composition, based upon parts by weight per 100 parts by weight of rubber ("phr"), the method comprising the steps of:
    mixing, at a temperature in a range of from 135° C. to 180° C., ingredients including:
        100 parts by weight of at least one conjugated diene-based elastomer;
        from 30 phr to 130 phr of at least one reinforcing filler;
        from 2 phr to 55 phr of at least one oil softener selected from the group consisting of a mineral oil having a PCA content of less than 3% by weight, a vegetable oil, and combinations thereof; and
        from 4 phr to 20 phr of at least one silane coupling agent, thereby forming a first mixture;
    subsequently adding from 2 phr to 50 phr of ultra high molecular weight polyethylene (UHMWPE) to the first mixture and mixing, at a temperature of less than 135° C.,
        the first mixture, and the UHMWPE, thereby forming a tire tread-cap composition.

2. The method of claim 1 wherein the reinforcing filler is selected from the group consisting of silica, carbon black, and combinations thereof.

3. The method of claim 1 wherein the reinforcing filler does not include carbon black.

4. The method of claim 1 wherein the oil softener is selected from the group consisting of a treated distillate aromatic extract ("TDAE") oil, a mild extraction solvate ("MES") oil, a special residual aromatic extract ("S-RAE"), and combinations thereof.

5. The method of claim 1 wherein the silane coupling agent is selected from the group consisting of bis-3-(triethoxysilylpropyl) disulfide ("TESPD"), bis-3-(triethoxysilylpropyl) tetrasulfide ("TESPT"), a blocked mercaptosilane, and combinations thereof.

6. The method of claim 1 wherein the UHMWPE of the subsequently mixing step is present in an amount of from 5 phr to 50 phr.

7. The method of claim 1 wherein the UHMWPE of the subsequently mixing step is present in an amount of from 5 phr to 13 phr.

8. The method of claim 1 wherein the UHMWPE of the subsequently mixing step is present in an amount of from 2 phr to 3 phr.

9. The method of claim 1 wherein the temperature of the subsequently mixing step is less than 125° C.

10. The method of claim 1 wherein the temperature of the subsequently mixing step is in a range of from 90° C. to 124° C.

11. The method of claim 1 further comprising the step of adding a curative.

* * * * *